Nov. 7, 1972   D. LUTZ   3,702,195
MOTOR VEHICLE
Filed Aug. 3, 1970   3 Sheets-Sheet 1
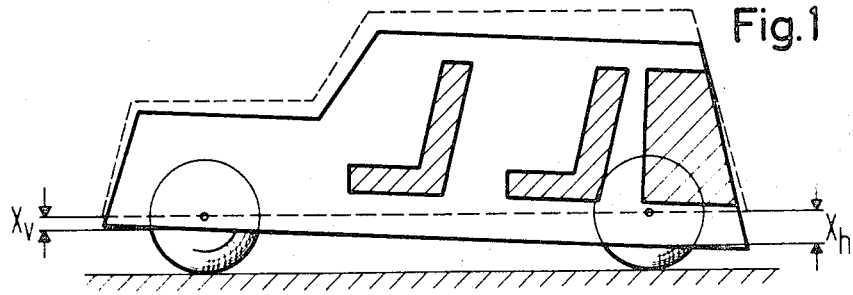
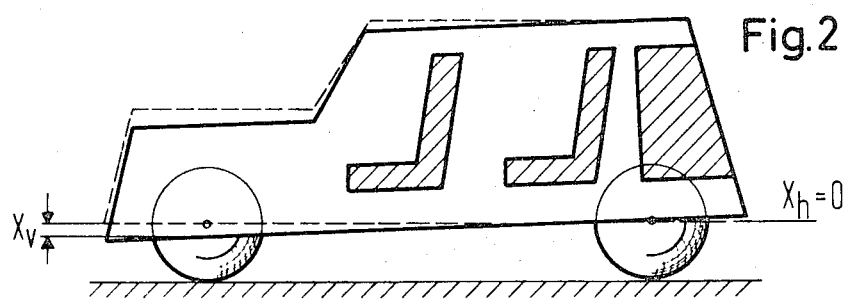
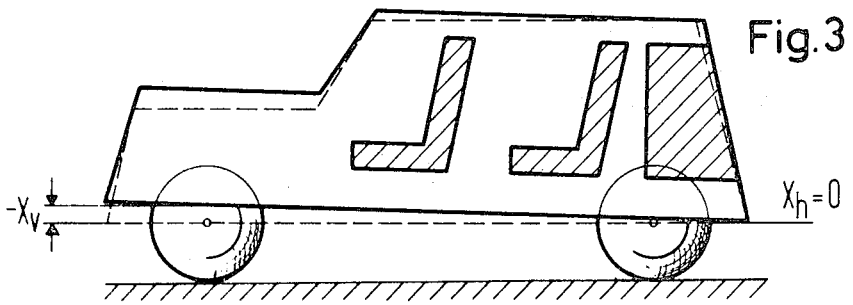
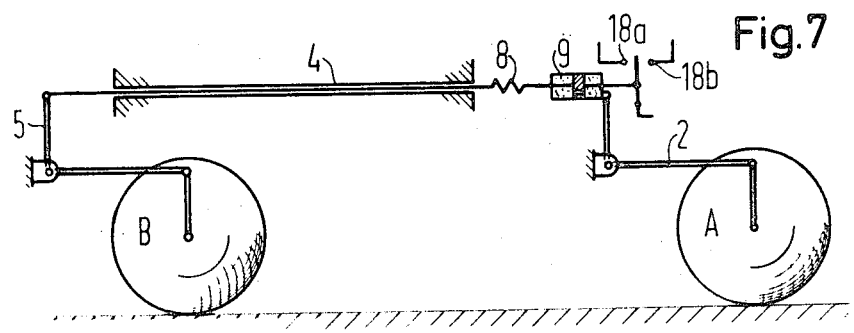

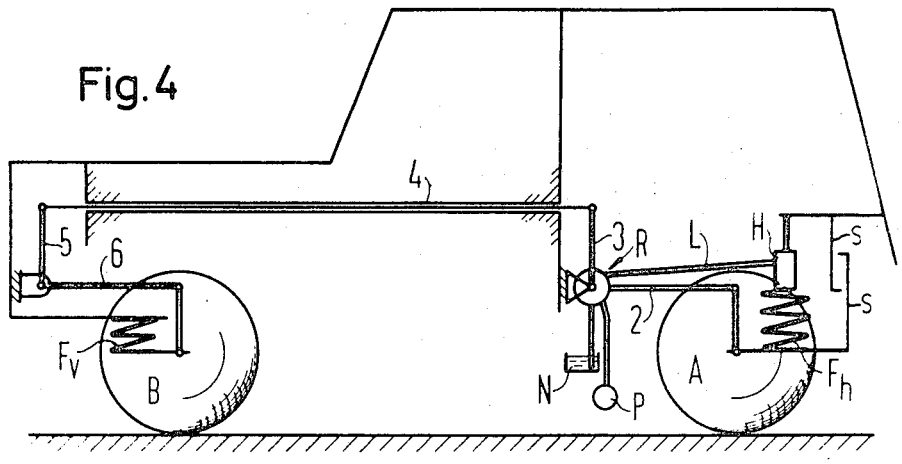
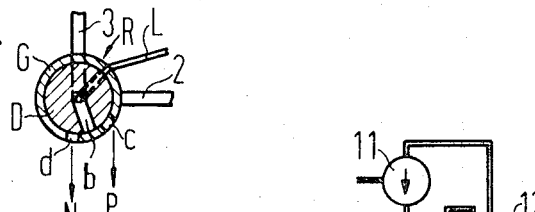
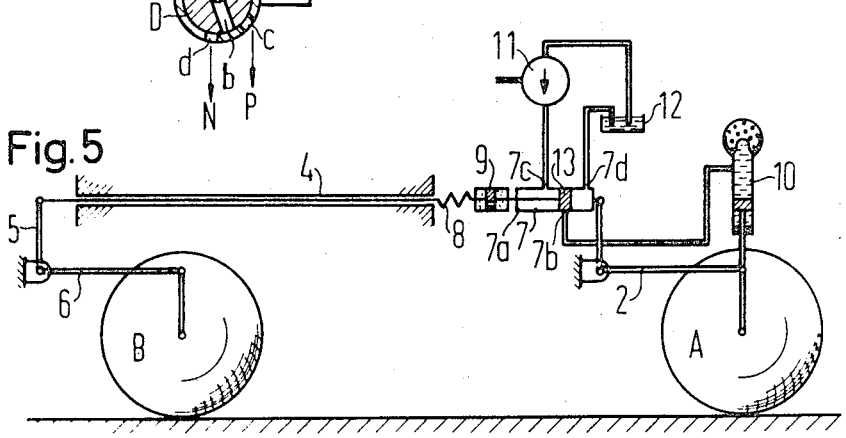
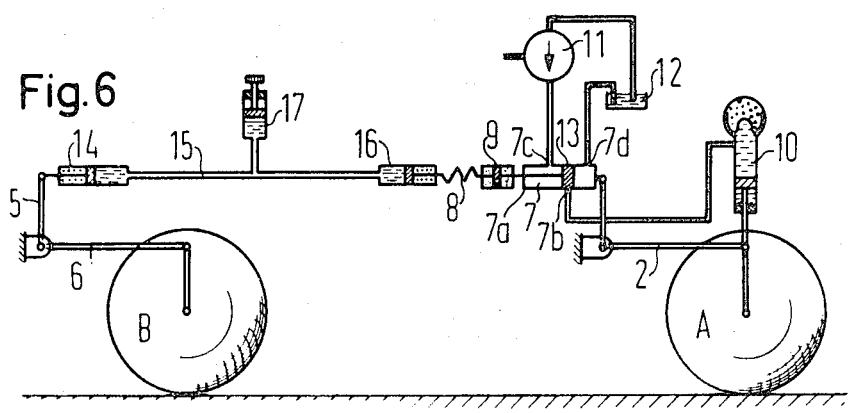

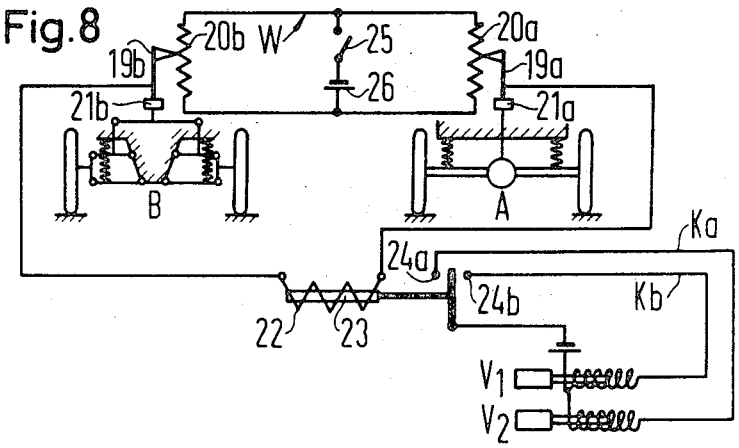
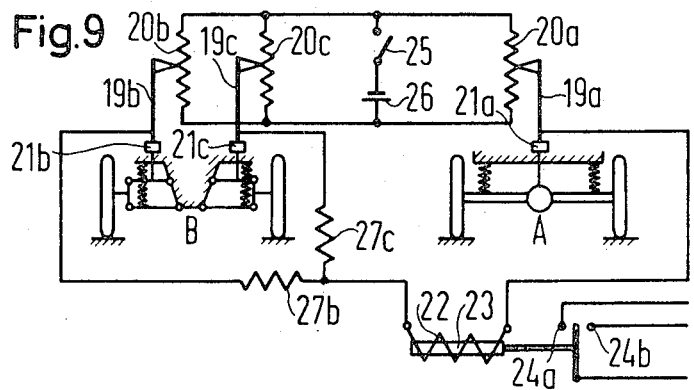
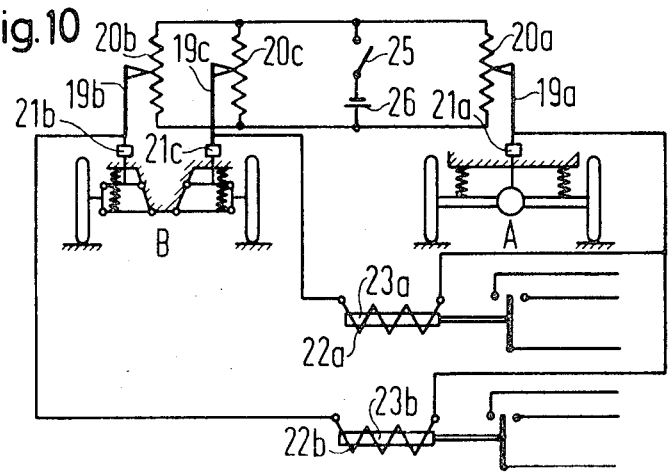

United States Patent Office 3,702,195
Patented Nov. 7, 1972

3,702,195
MOTOR VEHICLE
Dieter Lutz, Schweinfurt, Germany, assignor to Fichtel & Sachs AG, Schweinfurt am Main, Germany
Filed Aug. 3, 1970, Ser. No. 60,240
Claims priority, application Germany, Aug. 5, 1969,
P 19 39 719.4
Int. Cl. B16g *17/04*
U.S. Cl. 280—104                          20 Claims

ABSTRACT OF THE DISCLOSURE

A vehicle has means for adjusting the height of the chassis in respect of one of the vehicle axles, a level control connected to the adjusting means, and height indicating or measuring means interposed between both vehicle axles and the chassis, these height measuring means so controlling the level control means that the latter responds solely to deviations from a desired height of the chassis as measured.

---

The present invention relates to improvements in vehicles, especially motor vehicles, having two support axles, a chassis resiliently mounted on the axles, a means for adjusting the vertical position of the chassis interposed between one of the axles and the chassis, a level control means connected to the vertical position adjusting means, and a vertical position indicating or measuring means connected to the level control means and also interposed between the one axle and the chassis.

In conventional vehicles of this type, the vertical adjustment of the chassis to a desired height is controlled only in respect of the one axle in dependence on the deviation from a desired distance of the chassis from this one axle. If the resultant load on the one axle also produces a deviation from the desired chassis position in respect of the other axle, the level control is not influenced thereby so that the chassis may assume an oblique position in respect of the axles. This is not only esthetically objectionable but may also have more serious disadvantages, such as throw off the proper positioning of the headlights in respect of the road surface.

Known vehicle level controls in respect of both axles are known but are very complex.

It is the primary object of the present invention to control the level or horizontal position of a vehicle chassis so that it will remain constant regardless of the load and so that the angular adjustment of the headlights in respect of the road surface remains correspondingly constant whereby blinding of drivers coming in the opposite direction by upwardly tilted headlights will be avoided and the headlights will safeguard proper lighting of the road at all times.

The above and other objects are accomplished in accordance with this invention by providing a second vertical position indicating or measuring means interposed between the other axle and the chassis. Both vertical position indicating or measuring means so control the level control means that the level control means is responsive only to differences between deviations from a desired vertical position of the chassis measured by the first and second vertical position indicating and measuring means.

The vertical position indicating or measuring means may be connected to the level control means by mechanical, hydraulic or pneumatic transmission means.

According to a preferred feature, the vertical position adjusting means for the chassis is usually a hydraulically operated motor or jack. A hydraulic circuit connects the hydraulic fluid supply to the motor for delivering and removing hydraulic fluid to and from the motor. In this case, the level control means may be simply a valve in the hydraulic circuit for selectively delivering and removing the hydraulic fluid.

The level control valve may be a rotary or slide valve. In either case, the valve may have parts movable in relation to each other and these parts are movable in the same direction in dependence on the deviation from the desired vertical position of the chassis. These movable parts are so connected to the vertical position indicating or measuring means that changes in the vertical position in one direction effectuate movement of the movable valve parts in the same direction so that the relative position of the movable valve parts remains substantially the same when the vertical changes in the same direction are substantially the same.

The level control means may also be electrically operated, in which case it may include a control switch and electrical control circuits connected to the switch to be selectively energized thereby in dependence on the deviation from the desired vertical position of the chassis to operate the vertical position adjusting means.

According to one embodiment of the present invention, the electrically operated level control means includes an electrical measuring bridge, transducers, such as potentiometers, converting the deviation from the desired vertical position of the chassis into electrical measuring parameters or control signals, and an electrical control element, such as a solenoid, the measuring bridge being connected, on the one hand, to the transducers and, on the other hand, to the electrical control element which selectively responds to voltage differences in the measuring bridge.

In the latter embodiment, the solenoid may operate valves in a hydraulic circuit which actuates a hydraulic motor used as the vertical position adjusting means.

Since the vertical movement of the chassis may differ at each end, depending on the form of the axles and the resilient support, the vertical position indicating or measuring means preferably comprises two vertical position measuring elements which measure the level of the chassis above the respective axles at different points. A simple electric circuit may readily derive the average value of the measured parameters and such average value is then used as the control signal for operation of the vertical position adjusting means.

Furthermore, a damping means may be interposed between at least one of the vertical position indicating or measuring means and the level control means so that relatively minor deviations from the desired vertical position of the chassis, which are of short duration, are not transmitted to the level control means.

According to a preferred feature, the vertical position adjusting means and the resilient support means for the chassis form a hydropneumatic unit.

It is also advantageous to provide limit means for limiting the vertical adjustment or movement of the chassis to avoid defective adjustments in case of extraordinary load distributions, such as an overload in the trunk.

The above and other objects, advantages and features of the present invention will become more apparent from the following detailed description of certain now preferred embodiments thereof, taken in conjunction with the accompanying drawing wherein FIGS. 1 to 3 are schematic side views of a motor vehicle, showing a loaded vehicle without level control in FIG. 1, a loaded vehicle with a level control only at the most heavily loaded axle in FIG. 2, and a vehicle wherein only the rear trunk is loaded and the level control is limited to the rear axle in FIG. 3;

FIG. 4 schematically illustrates a level control for the resilient support of a vehicle chassis according to one embodiment of this invention, the control extending only to one axle;

FIG. 4a schematically shows a rotary valve used in the level control of FIG. 4;

FIG. 5 shows a modification wherein a pressure fluid operated slide valve is used for the control;

FIG. 6 shows another modification wherein a hydraulic transmission is used for the level control;

FIG. 7 illustrates yet another modification wherein an electric switch is used in the level control;

FIG. 8 diagrammatically shows an embodiment wherein the level control is wholly electrically operated;

FIG. 9 similarly illustrates a modification of a wholly electrically operated level control; and FIG. 10 is a diagram of a vertical position adjustment for the chassis wherein the distance of the chassis from one axle is controlled at two points by different vertical position adjusting elements in dependence on two vertical position measurements at the other axle.

In the following description, the term "low position" is used for the chassis position which is below the normal level of the chassis and "high position" for the chassis position which is above the normal level of the chassis.

To avoid redundancy in the description, like reference numerals designate like parts functioning in a like manner in all figures of the drawing.

In FIGS. 1 to 3, the two passenger compartments and the rear trunk are indicated by the hatched areas of the vehicle which runs on front and rear wheels constituting the two support axles for the front and rear portions of the vehicle chassis.

As shown in FIG. 1, when the vehicle is loaded without controlling the level of the chassis, both ends of the chassis will assume a low position, the extent of the respective deviations from nominal positions being determined by the load distribution and being indicated as $X_h$ at the rear axle and as $X_v$ at the front axle.

If the level is controlled at the rear axle, as has been proposed in conventional level controls, $X_h$ is corrected to zero, i.e. the chassis level at the rear axle is as desired. However, since the chassis remains in its low position at the front axle, where there is no level control, the chassis assumes an oblique position and the headlights are turned down towards the road surface, thus no longer properly illuminating the road.

When, as shown in FIG. 3, the rear trunk is loaded while the passenger compartments carry little load, the chassis will be tilted back, assuming a high position at the front axle and causing an upwardly directed oblique position of the chassis and the headlights, which will causue blinding of drivers in oncoming traffic.

FIG. 4 shows an embodiment of a level control according to the present invention to avoid the chassis positions shown in FIGS. 1 to 3. In this figure, the chassis and vehicle body are shown in outline only and those portions of the chassis which fixedly support operating parts of the control arrangement are indicated by hatching. The chassis is seen to be resiliently supported on axles A and B by shock absorbers $F_h$ and $F_v$. The resilient suspension means $F_h$ is shown to form a unit with a vertical position adjusting means H which is a hydraulic motor or jack connected with the hydraulic circuit L. A limiting means consisting of engageable stops S, S is provided to limit the maximum height of the chassis in respect of axle B. A control valve R in the hydraulic circuit regulates the operation of the jack H by selectively connecting the jack with a hydraulic fluid delivery pump P or a hydraulic fluid sump N.

The vertical deviation of the chassis position from the nominal position in relation to the rear axle A is indicated or sensed by a linkage 2 interposed between the axle and the chassis, and also connected to the level control means constituted by valve R. As shown in FIG. 4a, the valve has a rotary valve housing G which is connected to linkage 2 so that a vertically reciprocating movement of the linkage is translated into a rotary movement of the valve housing, i.e. a change in the vertical position of the chassis, as indicated by a corresponding movement of the linkage, operates the level control valve R in a manner to be described hereinbelow.

In accordance with this invention, a vertical position indicating or sensing means is also arranged at the front axle B of the vehicle, the means used in the embodiment of FIG. 4 being a bell crank lever 5, 6 whose pivoting movement corresponds to vertical position changes of the chassis in respect to the front axle and is transmitted by a Bowden cable 4 to a lever 3 connected to the rotary valve body D of level control valve R (see FIG. 4a).

It will be appreciated from a joint consideration of FIGS. 4 and 4a that vertical position changes of the chassis at both axles in the same direction will result in rotary motions of valve housing G and valve body D in the same direction. The valve body D has a radial bore in communication with the hydraulic circuit L and the rotary valve housing G has two radially extending ports c and d connected, respectively, to pump P and fluid sump N. When the chassis is in the desired horizontal position, the radial valve body bore b is aligned neither with valve housing port c or d, which position of the level control valve R is shown in FIG. 4a. In other words, the hydraulic circuit is shut off from the pump and the sump, i.e. the vertical position adjusting jack H for the chassis is inoperative. If there is a deviation from the desired level indicated by a difference of the measured chassis height at the front and rear axles, a respective one of the vertical position indicating or measuring means will rotate the valve housing G and valve body D relative to each other by means of lever 3 or linkage 2 so that valve body bore b will be aligned either with port c or port d, i.e. to connect the hydraulic circuit L either to the hydraulic fluid pump P or the fluid sump N and thus to move the jack up or down to adjust the vertical position of the rear portion until its deviation from the normal position equals the deviation of the front portion of the chassis.

The modification shown in FIG. 5 is similar to the embodiment of FIG. 4 but the rotary valve is replaced by a slide valve 7. The valve comprises valve housing 7a and a sliding piston 13 in the housing whose rod is connected to the mechanical transmission 4 by means of a spring 8. The movement of the piston 13 in response to movement of the transmission 4 is damped by a hydraulic damping means 9 associated with the piston rod to damp its movement.

In this modification, the resilient support means for the chassis and the vertical position adjusting means therefor is constituted by a hydropneumatic jack unit 10. The hydraulic operating circuit for this unit includes a line 7b connecting one of the cylinder chambers of the jack to the valve 7 and two branch lines 7c and 7d connected to respective chambers of the valve housing 7a, branch line 7c leading to hydraulic fluid pump 11 and branch line 7d leading to hydraulic fluid sump 12.

The operation of this arrangement is as follows:

When a load is placed on the chassis at the rear axle A, the linkage or bell crank lever 2, whose one arm is connected to valve cylinder 7a of level control valve 7, will move the cylinder to the right, as seen in FIG. 5. If the mechanical transmission 4 and the valve piston body 13 were fixedly connected to the chassis, the movement of the valve housing 7a to the right would place hydraulic circuit lines 7b and 7c in communication through the left valve chamber, thus enabling the pump 11 to deliver hydraulic fluid to jack 10. This would exert a downward pressure on the piston in the hydropneumatic jack 10 and correspondingly raise the cylinder of the jack which is fixedly connected to the chassis and thus is raised with the cylinder until the bell crank lever 2, which is also fixedly connected to the chassis, moves the valve cylinder 7a back sufficiently to block hydraulic fluid line 7b by valve piston body 13. At this point, no further hydraulic fluid would be delivered to the jack 10, the chassis having reached the desired horizontal position.

However, the vehicle load also influences the vertical position of the chassis at front axle B. A low position of the chassis at axle B causes the bell crank lever 5, 6 to pivot counterclockwise. This causes Bowden cable 4 to move left, as seen in FIG. 5, pulling valve piston body 13 with it to the left. This causes the piston body to block hydraulic fluid circuit line 7b sooner than it would otherwise be blocked, i.e. to discontinue operation of jack 10 before it has raised the chassis to what would be its normal level. In other words, the chassis will remain at the same low position at the rear axle as it is at the front axle and will thus be level.

To avoid level control operation each time a low position is caused at one of the axles for no more than an instant or so, such as may be caused by unevenness in the road, the damping means 9 and resilient connection 8 is arranged between the transmission 4 and the valve piston 13 to absorb such instantaneous movements and prevent them from being transmitted to the level control valve 7.

The modification of FIG. 6 uses the same level control as that of FIG. 5 hereinabove described but the mechanical transmission between the vertical position measuring means 5, 6 and the level control 7 is replaced by a hydraulic transmission which includes a transmitting hydraulic motor 14 and a receiving hydraulic motor 16 interconnected by a hydraulic line 15. The pistons of these hydraulic motors are respectively connected to the bell crank lever 5, 6 and the level control valve piston body 13. In the illustrated embodiment, a manual control of the transmission may be added to the arrangement in the form of a set screw adjusting the position of a piston in a hydraulic adjusting cylinder 17 connected to the line 15. In all substantial respects, this modification operates in the same manner as the embodiment of FIG. 5.

In the embodiment of FIG. 7, the level control is electrically operated. For this purpose, a pair of electrical control contacts 18a, 18b are connected to respective electrical control circuits (not shown) one of which is energized. As will be obvious to those skilled in the art, the electrical control circuits, when energized, may operate solenoid valves in the hydraulic operating circuit of a jack, such as shown in FIGS. 5 or 6.

As will be clear from a consideration of the previously described operation of the level control, deviations from the desired vertical position of the chassis will operate bell crank lever 2 and/or 5, causing corresponding movement of a switch lever to close contact 18a or contact 18b, depending on the direction of movement, and thus energizing one of the control circuits for adjusting the vertical position of the rear end of the chassis in the desired direction, i.e. either up or down.

The level control of FIG. 8 is constituted by a Wheatstone bridge W. This measuring bridge is energized by a voltage source 26. One terminal of a pair of voltage divider resistances 20a, 20b is connected to one pole of the voltage source while the other terminal of these resistances is connected to a switch 25 interposed between these other terminals and the other pole of the voltage source 26. Each voltage dividing resistance or potentiometer 20a, 20b has a movable contact 19a, 19b which are connected via electrical insulators 21a, 21b to any suitable vertical position indicating or measuring means (not shown in this figure), such as the bell crank levers used for this purpose in the hereinbefore described embodiments of the present invention. Thus, the contacts will be moved in direct response to the vertical position of the chassis measured at axles A and B. Furthermore, each movable contacts 19a, 19b is electrically conductively connected to a respective terminal of the coil 22 of a solenoid whose armature is moved in one or the other direction in response to a respective voltage difference between the contacts 19a and 19b. The armature carries a switch arm which is thus moved into contact either with terminal 24a or 24b of respective control circuits Ka and Kb to energize a respective one of these circuits. These control circuits, when energized, operate solenoid valves V₁ and V₂ for operating a jack H, such as shown in FIG. 1.

When the voltage differential between movable contacts 19a and 19b is zero, the switch arm is in a neutral position (shown in FIG. 8) and both electrical control circuits Ka and Kb are deenergized. Depending on which of the circuits is energized, the rear end of the chassis will be jacked up or lowered to reach the desired level.

The modified arrangement of FIG. 9 differs from the embodiment of FIG. 8 only in that the single variable resistance 20b is replaced by a pair of variable resistances 20b, 20c, with movable contacts 19b, 19c. Each of the movable contacts is mechanically connected via electrical insulators 21b and 21c to a respective vertical position measuring means mounted at opposite ends of the axle B. Electrical resistances 27b and 27c are provided in the electrical connections between the movable contacts 19b and 19c to one terminal of the solenoid coil 22. The voltage at the connecting point of resistances 27b and 27c constitutes the average voltage of the voltages at contacts 19a and 19b.

The modification of FIG. 10 differs from that of FIG. 9 in that the voltages from contacts 19a and 19b are fed to the one ends of coils 22a and 22b of separate solenoids whose other ends are connected to contact 19a. The armatures 23a and 23b of the separate solenoids each operates a separate switch for energizing the two control circuits more fully described in connection with FIG. 8. With this modification, it is possible to control two vertical position adjusting means at the rear axle A, one in response to the voltage difference between the movable contacts 19a and 19b, and the other in response to the voltage difference between the movable contacts 19a and 19c. In other words, the chassis will be vertically moved at axle A according to the level deviation of the chassis from the measure at both ends of axle B.

I claim:

1. In a vehicle, in combination:
    (a) a chassis having a front portion and a rear portion;
    (b) a front axle and a rear axle;
    (c) yieldably resilient suspension means connecting said axles to said portions respectively and biasing said portions toward respective normal vertical positions relative to the associated axles;
    (d) sensing means for sensing the deviation of each chassis portion and the associated axle from the normal relative position thereof under an applied load;
    (e) position adjusting means interposed between one of said chassis portions and the associated axle for adjusting the vertical position of said one chassis portion relative to said associated axle; and
    (f) level control means operatively connected to said sensing means and responsive to the difference of said sensed deviations for actuating said position adjusting means in a direction to make the deviation of said one chassis portion and the associated axle from the normal position thereof equal to the sensed deviation from the normal position of the other chassis portion and the axle associated therewith,
        (1) said other axle and said other chassis portion being free during said actuating to move relative to each other in response to an applied load and the biasing force of the associated suspension means only.

2. In the vehicle of claim 1, a mechanical transmission means connecting at least one of said sensing means to said level control means.

3. In the vehicle of claim 2, the mechanical transmission means being a linkage.

4. In the vehicle of claim 2, the mechanical transmission means being a Bowden cable.

5. In the vehicle of claim 1, a hydraulic transmission conneiting at least one of said sensing means to said level control means.

6. In the vehicle of claim 1, an electric transmission connecting at least one of said sensing means to said level control means.

7. In the vehicle of claim 1, said position adjusting means including a hydraulically operated motor, a supply of hydraulic fluid, a hydraulic circuit connecting the hydraulic fluid supply and said motor for delivering and relieving hydraulic fluid to and from the motor, and said level control means including a valve in the circuit for selectively delivering and relieving the hydraulic fluid.

8. In the vehicle of claim 7, the valve being a rotary control valve.

9. In the vehicle of claim 7, the valve being a slide control valve.

10. In the vehicle of claim 7, wherein the level control valve has valve parts movable in relation to each other, said parts being connected to inspective sensing means.

11. In the vehicle of claim 1, the level control means being electrically operated.

12. In the vehicle of claim 11, wherein the electrically operated level control means includes a control switch and electric control circuits connected to the switch and seletively energized thereby in dependence on the deviation from the said normal position of the chassis portions.

13. In the vehicle of claim 11, wherein the electrically operated level control means includes an electrical measuring bridge, transducers converting the deviation from the normal vertical position of the chassis portions into electrical control signals, and an electrical control element, the measuring bridge being connected, on the other hand, to the transducers and, on the other hand, to the electrical control element, the control element selectively responding to voltage differences between the transformers in the measuring bridge.

14. In the vehicle of claim 13, the transducers being potentiometers.

15. In the vehicle of claim 11, at least one of said position adjusting means being a hydraulically operated motor, a supply of hydraulic fluid, a hydraulic circuit connecting the hydraulic fluid supply and said motor for delivering and removing hydraulic fluid to and from the motor, and valves in the circuit for selectively delivering and relieving the hydraulic fluid, and said level control means being an electromagnetically actuated member for operating said valves.

16. In the vehicle of claim 1, at least one of the said sensing means comprising two vertical position measuring elements, the level control means comprises a plurality of control elements, the measuring elements being connected to respective ones of the control elements, and the position adjusting means having a plurality of vertical position adjusting elements, respective ones of the control elements being associated with corresponding ones of the adjusting elements.

17. In the vehicle of claim 1, a damping means interposed between at least one of the sensing means and the level control means, the damping means being arranged to absorb short deviations from a desired vertical position of the chassis and thus to prevent their transmission to the level control means.

18. In the vehicle of claim 1, one of the resilient means and said position adjusting means forming a hydropneumatic resilient unit.

19. In the vehicle of claim 1, limit means for limiting the vertical adjustment of the chassis in respect of the one axle.

20. In the vehicle of claim 1, at least one of said sensing measuring means comprising two vertical position measuring elements, means for computing an average of the measured respective positions connected to the measuring elements, the computing means feeding a control signal to the level control means.

References Cited

UNITED STATES PATENTS

| | | | |
|---|---|---|---|
| 3,539,197 | 11/1970 | Remaud | 280—104 |
| 3,552,763 | 1/1971 | Yasin | 280—104 |
| 3,374,848 | 3/1968 | Castelet | 280—104 |
| 2,099,819 | 11/1937 | Mercier | 280—104 |

PHILIP GOODMAN, Primary Examiner